United States Patent [19]

Long

[11] Patent Number: 5,546,630
[45] Date of Patent: Aug. 20, 1996

[54] BLAST WIPER FOR MOTOR VEHICLE LIGHTS

[76] Inventor: Andre Long, 17-4th Ave., P.O. Box 11, Clair, N. B. EOL 1BO, Canada

[21] Appl. No.: 368,544

[22] Filed: Jan. 4, 1995

[51] Int. Cl.$^6$ .............................. B60S 1/62; B60S 1/46; B05B 1/08
[52] U.S. Cl. ................ 15/313; 15/250.002; 15/319; 239/99; 239/105; 239/284.2
[58] Field of Search ............. 15/250.01, 250.02, 15/250.03, 250.04, 250.002, 250.003, 313, 319; 239/69, 70, 99, 105, 284.2, 459, 558, 567, DIG. 21

[56] References Cited

U.S. PATENT DOCUMENTS

| | | | |
|---|---|---|---|
| 840,769 | 1/1907 | Harmer | 15/250.1 |
| 3,117,727 | 1/1964 | Pollock | 239/284.2 |
| 3,469,088 | 9/1969 | Coleman | 15/250.1 |
| 3,686,704 | 1/1972 | Sharpe et al. | 15/250.01 |
| 3,915,385 | 10/1975 | Hassinger | 239/284.2 |
| 4,026,468 | 5/1977 | Tinder | 239/284.2 |
| 4,044,953 | 8/1977 | Vogel | 239/284.2 |
| 4,505,001 | 3/1985 | Fasolino | 15/250 |
| 4,765,017 | 8/1988 | Berger et al. | 15/250 |
| 5,083,339 | 1/1992 | Bristow | 15/250.002 |
| 5,097,563 | 3/1992 | Cowan | 15/313 |
| 5,140,719 | 8/1992 | Cowan | 15/313 |

FOREIGN PATENT DOCUMENTS

| | | | |
|---|---|---|---|
| 773876 | 12/1967 | Canada | 141/5 |
| 820665 | 8/1969 | Canada | 141/5 |
| 907808 | 8/1972 | Canada | 15/16 |
| 943310 | 3/1974 | Canada | 15/17 |
| 1131858 | 9/1982 | Canada | 15/17 |
| 2360446 | 4/1978 | France | 15/250.002 |
| 2411547 | 9/1975 | Germany | 15/313 |

OTHER PUBLICATIONS

McCord, Heavyduty Headlamp Washer, Nozzle Kit 230, Jul. 27, 1976.

*Primary Examiner*—David Scherbel
*Assistant Examiner*—Randall E. Chin

[57] ABSTRACT

A wiping system for cleaning snow accumulating on the rear signalling lights of a vehicle, using intermittent blasts of air. The blast wiping system comprises timers and a solenoid valve for regulating a flow of air from the air reservoir of the vehicle into intermittent gushes of air. The wiping system comprises also supply tubing for connecting the solenoid valve to the air reservoir of the vehicle, nozzles for directing the intermittent gushes of air toward a surface of the vehicle's lights, and delivery tubing for connecting the solenoid valve to the nozzles. Each nozzle of the blast wiping system is placed near a lower quadrant of the light surface. Each nozzle is further oriented to deflect a gush of air in a tangential upward direction relative to the surface of the light, whereby a layer of snow on that surface is lifted off and blown away in a patch-like formation. The components of the blast wiping system are pre-wired and pre-tubed such that an installation thereof on a vehicle by a person unexperienced with pneumatic does not compromise the safety purpose of the compressed air system of the vehicle.

22 Claims, 8 Drawing Sheets

BLAST WIPER FOR MOTOR VEHICLE LIGHTS

FIELD OF THE INVENTION

The present invention relates to devices for cleaning motor vehicle lights, and more specifically, to a wiping system for cleaning snow accumulating on the rear lights of a transport trailer, using intermittent gushes of air.

BACKGROUND OF THE INVENTION

A common problem with driving a transport truck during the winter is that the turbulence created by the moving transport swirls up flurries of snow which pack against the rear end of the trailer, covering the braking and turning lights of the vehicle. The operator of the transport must stop frequently, especially at night, to clean the light lenses to prevent accident from a following driver.

One difficulty in providing light wiping function on a transport trailer is that a source of power for operating such device is often a restricted one. The number of electrical conductors in the service cable from the truck to the trailer is, in many cases, limited to power supply to the position lights, signal lights, brake lights, and a third axle lifting mechanism. Similarly, the air power supply to the trailer brake actuators is conforming to strict safety regulations, and a taping into an air line must not alter the performance of the braking system.

Another obstacle in providing light wiping functions on a transport trailer is that the wiping device must be adaptable to existing trailers with as few modifications as possible. Furthermore, if the installation is done by a person having limited knowledge of electricity and pneumatic, the installation instructions must be easily understood such that an installer will not tamper with the safety aspects of the vehicle.

A number of prior art devices have been developed for cleaning light lenses, and especially for cleaning the head lights of a vehicle having a compressed air system. For example U.S. Pat. No. 4,505,001 issued Mar. 19, 1985 to Fasolino describes a high pressure nozzle in combination with a flexible tube whipping from side to side against the surface of the light. The high pressure nozzle discharges cleaning fluid against the surface of the lens, while the whipping effect of the tube is obtained by forcing a stream of air under high pressure through the tube.

Another example of an air wiping system is described in U.S. Pat. No. 5,083,339 issued Jan. 28, 1992 to Bristow. The device uses a wiper arm driven by a pneumatic motor. The arm has a plurality of apertures through which a mixture of air and cleaning fluid is ejected under high pressure against the surface of a headlight.

In both the previously described inventions, the operation of the wiper is continuous upon energizing the system by the driver. The flow of air from the vehicle's air reservoir is also continuous during the operation of the wipers. Such a constant outflow of air from a truck's air brake system is not desirable because it may affect the performance of the air brake system of the vehicle, as will next be explained.

According to an aforesaid comment, an air brake supply system of a vehicle is made to comply to safety standards from regulatory bodies. For example, an air brake supply system for a transport truck must comprise an air reservoir on the truck which has the volume of at least 12 times the combined volume of all service brake chambers at a maximum displacement of the pistons or diaphragms. Similarly, the trailer must be equipped with one or more air reservoirs having a combined volume of air that is at least 8 times the combined volumes of all service brake chambers. The air pressure in those reservoirs must be maintained preferably at above 100 psi, and not less than 90 psi. The compressor of the truck must be capable of building air pressure within the system after every use of the brakes. Typically, the requirement is that the compressor must be capable of building up air pressure in the air system from 85 psi to 100 psi within 25 seconds.

Thus, an air wiping device which continually drains air from the air brake system may require a larger compressor on the vehicle to ensure compliance to the required performance of the safety standard. Moreover, such a continuous outflow of air of the prior art devices may cause the compressor to engage often to make up the system pressure, and may increase thereby the fuel consumption of the vehicle.

Other air wiping systems to remove snow from vehicle mirrors and windows are described in U.S. Pat. No. 5,097,563 issued on Mar. 24, 1992 to Cowan, and in U.S. Pat. No. 5,140,719 issued on Aug. 25, 1992, also to Cowan. These systems comprise a blower to deliver a pre-heated high velocity air stream to nozzles located adjacent the surfaces to be cleaned.

An installation of such a blower and a heater under a transport trailer would likely require intricate housing to protect the devices and nozzles from the climate and road splashes. Such installation would also probably require the upgrading of the service cable from the truck to the trailer to supply electrical energy to the blower and the heater.

Another prior art device for cleaning the lenses of vehicle's lights is disclosed in Canadian Patent no. 1,131,858 issued on Sept. 21, 1982 to Savage et al. The system comprises a source of compressed air, pressure accumulators, regulator valve, check valve, directional valve, a reservoir of washing fluid and delivery nozzles.

Likewise, the complexity of the proposed piping of this invention renders it difficult for retrofitting the equipment on a transport trailer by a person unexperienced with pneumatics.

Furthermore, another inconvenience with an air wiping system installed near the rear lights of a transport trailer is that when the system is not in use, the orifice of a prior art nozzle may freeze from snow and slush accumulating thereon, rendering thereby the system inoperative.

SUMMARY OF THE INVENTION

In the present invention however, there is provided a blast wiper for cleaning snow from the lights of a vehicle having a compressed air system. The blast wiper comprises automatic control means for regulating the outflow of air from the compressed air system into intermittent gushes of air. The blast wiper comprises also supply tubing for connecting the automatic control means to the compressed air system, nozzle means for directing the intermittent gushes of air toward a surface of the vehicle's light, and delivery tubing for connecting the automatic control means to the nozzle means.

The most significant advantage of the blast wiper is that intermittent gushes of air directed toward a surface of the rear lights of a vehicle are sufficient to maintain the rear lights visible when that vehicle is driving in snowy conditions, while preventing excessive outflow of air from vehicle's air reservoir.

Considering that a layer of snow is not completely opaque, a substantial thickness of snow can accumulate on the surface of a light lens before a signal from that light cannot be seen from a following driver. Therefore, an air blast wiping system which cleans the light surface at regular intervals is sufficient to maintain safe driving conditions, while using a minimum volume of air from the compressed air system.

In accordance to another aspect of the present invention, the nozzle of the blast wiper is placed near a lower quadrant of the light surface. The nozzle is further oriented to deflect a gush of air in a tangential upward direction relative to the surface of that light, whereby a layer of snow on that surface is lifted off and blown away by the gush of air, in a patch-like formation.

The additional advantage of this particular positioning of the nozzle is that a short blast directed tangent to and from below a snow covered light lens compresses the layer of snow upwardly and removes the layer as a large piece. Therefore, such positioning of the nozzle further ensures that a relatively small volume of air from the compressed air system of the vehicle is efficiently used to clean the light lens entirely.

In accordance with a further aspect of the present invention, the nozzle means is a popping nozzle comprising a spring biased expandable piston chamber and apertures communicating inside the piston chamber when the piston chamber is expanded from a nominal air pressure applied therein. Therefore the air flow directed through the piston chamber and exiting through the apertures is at least at that nominal pressure.

The popping nozzle of the present invention further ensures that the minimum volume of air drained from the air brake reservoir is used to its full pressure and velocity potential.

In accordance to another aspect of the invention, the air blast wiping system for transport trailer is a retrofit kit comprising a protection valve for mounting on the compressed air system of the transport trailer, for preventing an outflow of air from the air system when a pressure in the air system is below a pressure setting of the protection valve, and automatic control means for regulating the outflow of air from the compressed air system into intermittent gushes of air. The retrofit kit also comprises a single supply line tubing for connecting the protection valve to the automatic control means, nozzle means, and delivery tubing for connecting the automatic control means to the nozzle means.

The retrofit kit has pre-wired and pre-tubed components such that an installation of the air blast wiping system on a transport trailer by a person unexperienced with pneumatic does not compromise the safety aspects of the air brake system of the vehicle.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
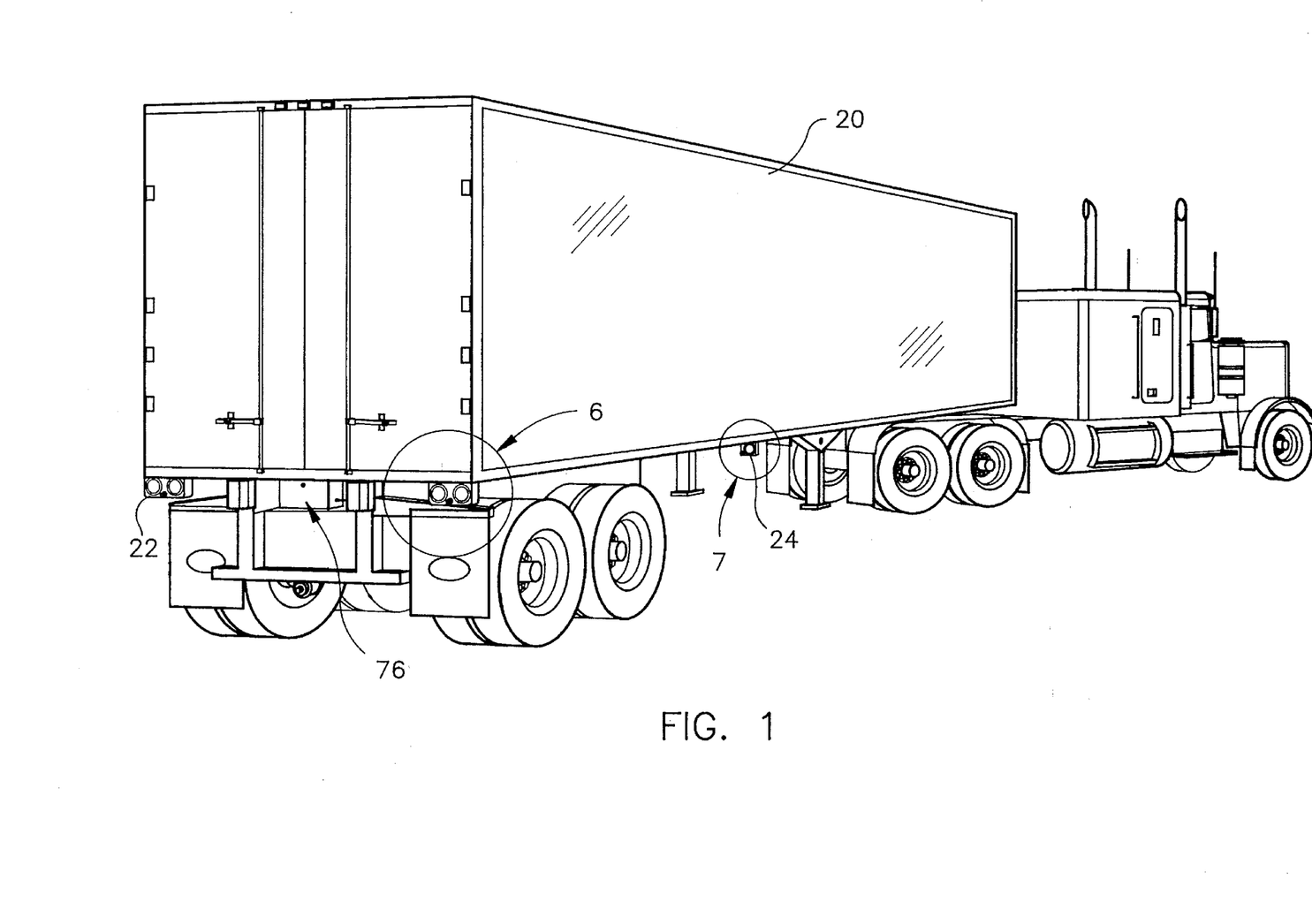
FIG. 1 illustrates a rear view of a transport trailer, and a typical location of the signalling lights.
Figure 7:
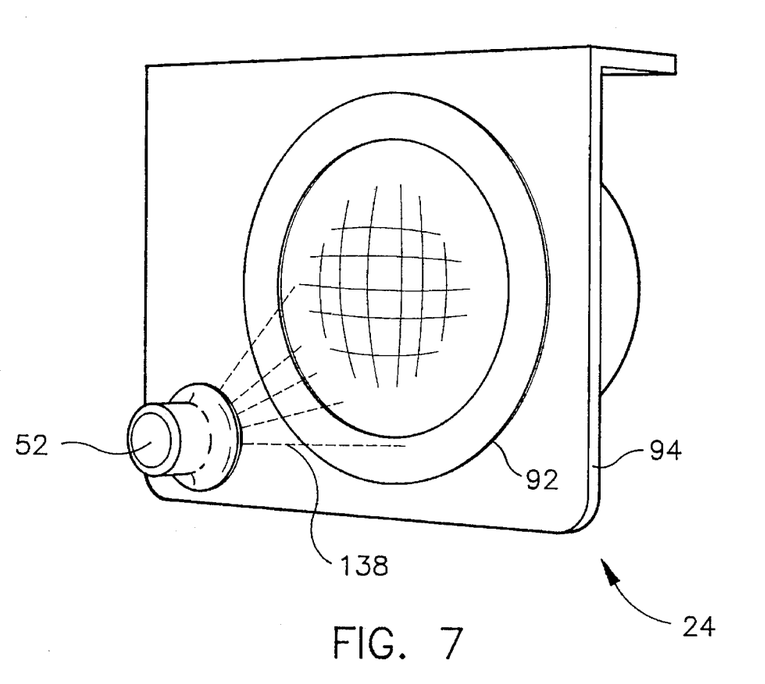
FIG. 7 illustrates an enlargement of detail 7 of FIG. 1 showing a preferred mounting of an air blast wiper on a single light fixture.

Referring to FIG. 1, there is illustrated a transport trailer 20, and a typical location of braking and turning lights 22. Some trailers, especially the newer models, have a single turning light 24 mounted near the middle of each lower side of the trailer 20, as illustrated on detail 7, for warning a nearby driver during a lane change.

The control box 76 of the rear light wiping system of the present invention is preferably mounted on the rear end of the trailer 20, where a length of tubing to the nozzles is minimum. Another preferred location for this control box 76 is under the lower driver side of the trailer near the front end thereof, where the operator can energize the blast wiper without having to walk to the rear of the vehicle.

Figures 2, 3:
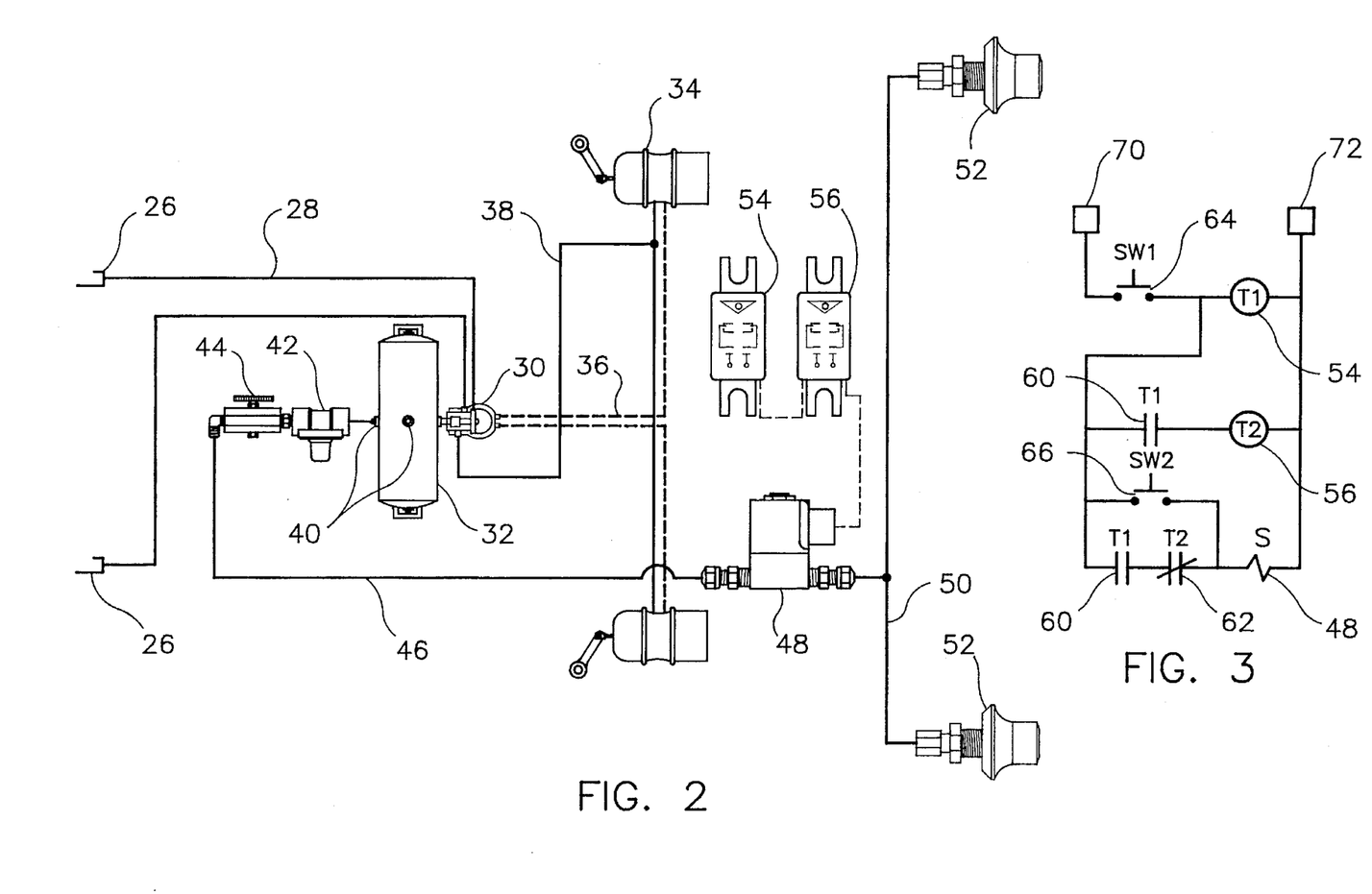
FIG. 2 is a piping schematic showing a preferred connection of the present invention to an air brake reservoir.
FIG. 3 is an electrical schematic of the control circuit for the present invention.

Referring now to FIG. 2, there is illustrated a piping schematic of a typical air brake piping system for a transport trailer. There is also illustrated the preferred piping instructions for an installation of the preferred embodiment of the invention. A typical air brake piping system comprises gladhand connectors 26 for mating with the air supply lines on the tractor truck, and air supply piping 28, connecting the gladhand connectors 26 to a full function valve 30. The full function valve 30 is mounted on an air reservoir 32, and provides air pressure to the brake chambers 34, through an emergency parking brake supply line 36, and a service braking supply line 38.

The air reservoir 32 of a transport trailer is normally equipped with several threaded fittings 40 for mounting for example, a pressure gauge, a drain valve, or auxiliary equipment of that kind in an orientation which best suits the location of the reservoir.

The supply line for the blast wiping system of the invention is connected to one of these fittings 40. The supply line for the blast wiper comprises a protection valve 42, a manual shut off valve 44, an inlet flexible tube 46 connected into a solenoid directional valve 48. The delivery line of the blast wiping system comprises an outlet flexible tube 50 connected into air delivery nozzles 52.

The manual shut-off valve 44 enables a person to close the system completely during non-use periods such as during the summer time. The protection valve 42 is a pressure controlling valve which allows full flow therethrough when the pressure inside the air reservoir is above a preset level of the valve 42, and which closes completely when the air pressure is under the preset level. A typical preset level for a protection valve 42 on an air brake system of a transport trailer is 90 psi. The protection valve 42 prevents outflow from the reservoir when such outflow could compromise the braking performance of the vehicle.

The solenoid directional valve 48 is controlled by two timers 54, 56. A first timer 54 controls the span between each blast, while the second timer 56 determines the duration of the air blast. Accordingly, a preferred time span between bursts of air is about 5 to 10 minutes, and a preferred duration of the air blast is 1 to 3 seconds.

The FIG. 3 is an electrical schematic of the control module controlling the operation of the solenoid inside the directional valve 48. The control module comprises a first timer 54 which is a flicker type timer where the output contacts are alternatively turned on and off as long as the input signal is maintained thereon. The control module also comprises a second timer 56 which is an off delay timer.

The coil of the first timer 54, labelled as T1, energizes a first normally open relay 60, which in turn energizes the solenoid 48, and the coil of the second timer 58, labelled as T2. A normally closed contact on a second relay 2 in series with first relay 60 responds to the second timer 56, to shut the power off solenoid 48 after the preset time interval of the second timer 56.

The circuit also comprises a first manual on-off switch 64 to energize the circuit, and a second push button switch 66 to bypass relay 60 and relay 62 for the purpose of verifying the operation of the nozzles 52. The circuit is preferably energized by connecting terminals 70 and 72 to the electric circuit of the park lights of the transport trailer such that the system is operative only when the park lights are turned on.

Figure 4:
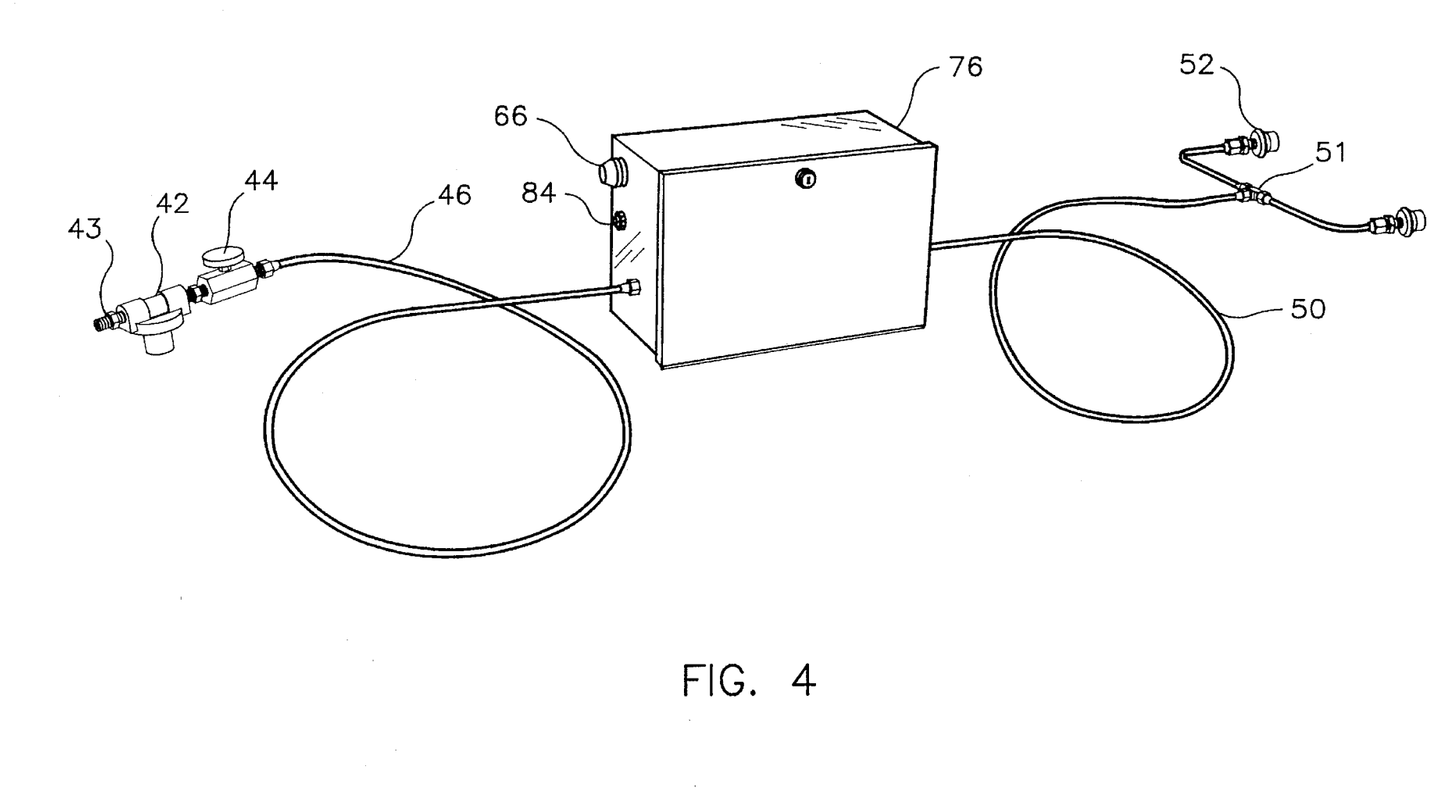
FIG. 4 illustrates the major components of a retrofit kit of the air blast wiping system.

Referring to FIG. 4, the retrofit kit for a blast wiping system for a transport trailer comprises a moisture resistant control box 76 containing the pre-wired electrical components, and a pre-tubed solenoid valve.

The retrofit kit is sold in a fully assembled format having a supply flexible tube 46, a manual shut off valve 44 and a protection valve 42 with a fitting 43, for connecting into an air brake reservoir. The retrofit kit further comprises a delivery flexible tube 50 connected to one or more nozzles 52 through a T-fitting 51.

It will be apparent to those skilled in the art of compressed air systems that the retrofit kit of the present invention may also be connected to the pressure piping of the air brake system, whenever such installation would be more appropriate to a particular type of vehicle.

The installation instructions for the retrofit kit herein described are simplified to four major steps, as follows;

a) to connect fitting 43 to the air system piping, or to the air reservoir 32 of the trailer, b) to connect electrical power supply wiring from the park lights circuit of the trailer into the on-off switch 64 of the control box 76, through a water-tight connector 84, c) to install the delivery nozzles 52 adjacent the light lenses to be cleaned, and d) to optionally shorten the flexible tubes 46 and 50 to provide a proper fit under the trailer.

The advantage of presenting the air blast wiping system in the form of a pre-assembled retrofit kit is that the possibility of tampering with the air brake supply system by an unexperienced installer is practically eliminated.

Figure 5:
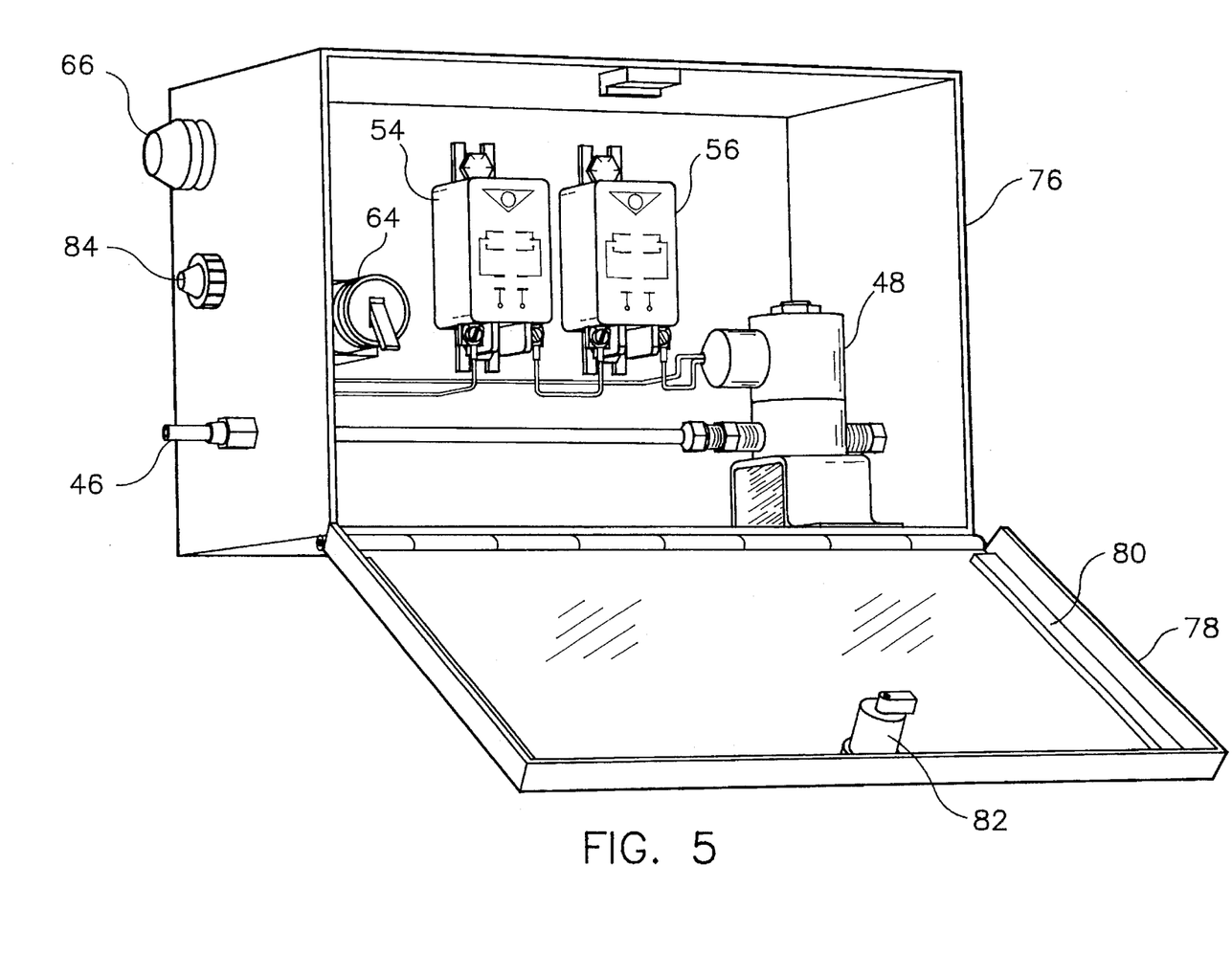
FIG. 5 shows the interior of the control box of the retrofit kit of the present invention.

The moisture resistant control box 76 of the retrofit kit is better illustrated on FIG. 5. The enclosure 76 contains a directional solenoid valve 48, a first timer 54, a second timer 56, a manual on-off switch 64, and a push button switch 66. The electrical components are pre-wired, and the timers are preferably preset at the factory. Similarly, the solenoid valve 48 is pre-tubed upon assembling this control module.

The control box 76 has a cover 78 with a sealing strip 80 and a closing latch 82, to provide easy access inside the enclosure by the operator, while protecting the control components from road splashes and other conditions natural to road driving.

For the same reasons, the electric supply wiring is routed inside the control box 76 through a watertight electrical connector 84. Similarly, the push button of manual bypass switch 66 is preferably a watertight panel mount type where the button is exposed on the outside surface of the control box 76, such that the operation of the nozzles 52 may be verified without opening the control box 76.

Figure 6:
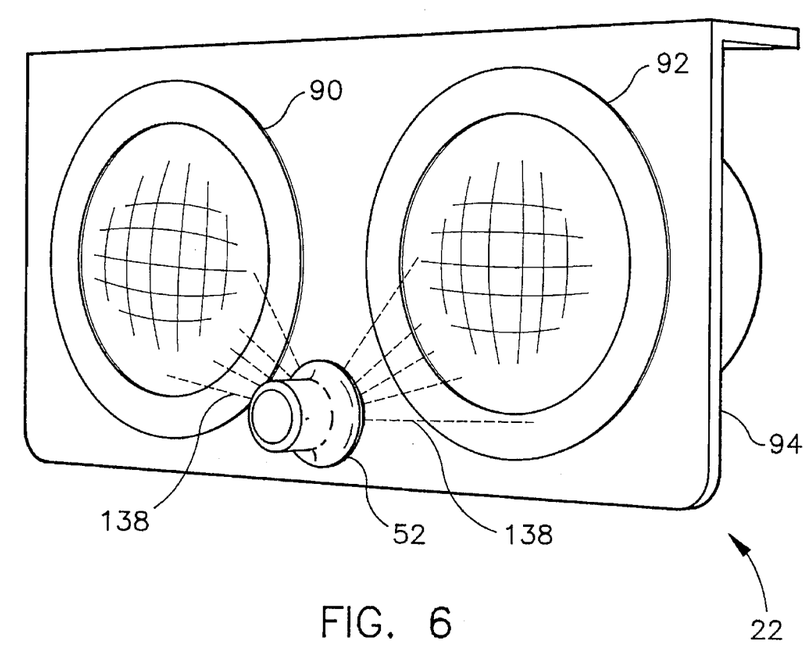
FIG. 6 illustrates a preferred mounting of an air blast nozzle on a double light fixture. The double light fixture is an enlargement of detail 6 of FIG. 1.
Figure 8:
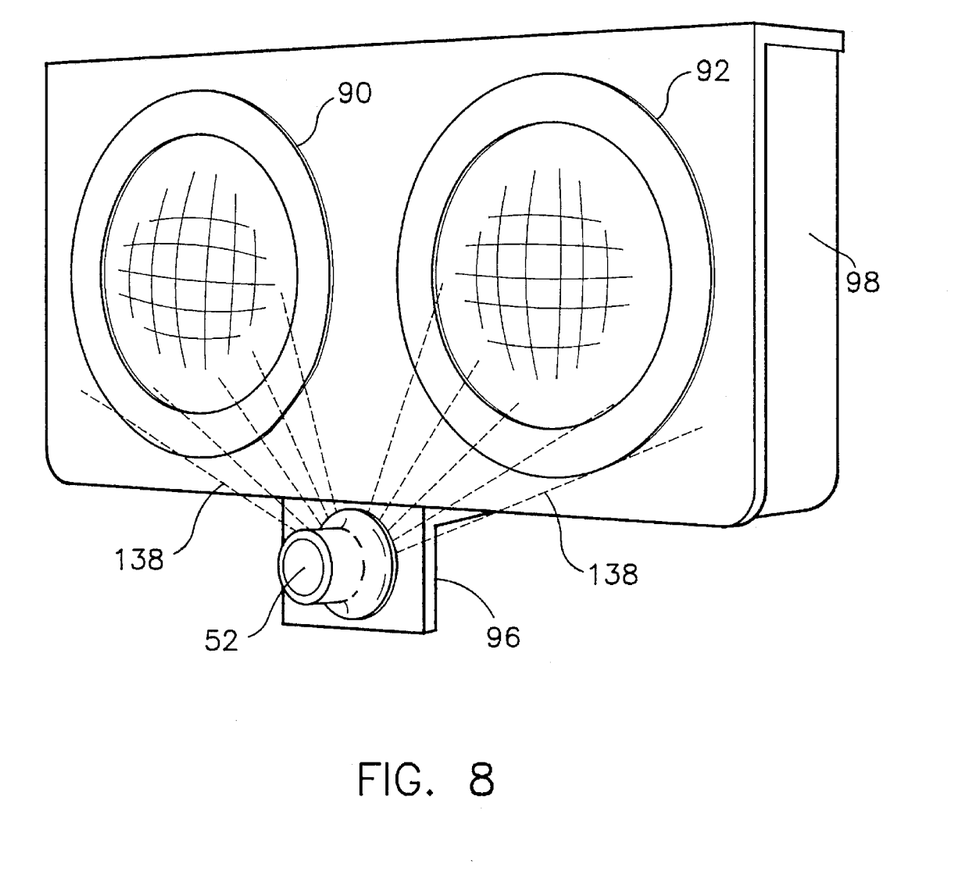
FIG. 8 is a second preferred installation of a blast wiper under a totally enclosed double light fixture.

Referring now to FIGS. 6, 7 and 8, there is illustrated a nozzle 52 which is installed near a lower quadrant of both the braking light 90 and the turning light 92. The nozzle 52 is installed through the front surface 94 of braking and turning light fixture 22 or turning light fixture 24, or onto a bracket 96 under a fully enclosed braking and turning light fixture 98.

Optionally, a rear double light fixture 22, or a single side light fixture 24 having a nozzle incorporated in its front surface may be manufactured as an integral component, and included in the retrofit kit of the invention.

The nozzle 52 has either two slotted openings for directing a gush of air toward light lenses on both sides of the nozzle, or one slot for directing air toward one light lenses of a single turning light fixture 24.

The slots of the nozzle 52 are oriented to discharge a gush of air in an upward direction tangent to the surface of the lenses to be cleaned. The reason for this is that snow which accumulates on the surface of the lenses is compressed upwardly by the blast, causing a layer of snow to lift off in a patch-like formation exposing thereby the entire surface of the light. This is a commendable advantage over a stream of air coming from the top of the lenses where gravity helping, the layer of snow is blown in small fragments. In this later case, one short blast of air may often be not sufficient to clean the surface of the lenses completely.

The preferred embodiment of the delivery nozzle 52 is a popping nozzle as illustrated on FIGS. 9 to 12. The popping nozzle 52 comprises a hollow threaded stem 100 machined to receive a tube fitting 102, whereby delivery tube 50 is connected thereto. The nozzle also comprises a mounting nut 104, a backing housing 106 and a sliding housing 108.

The sliding housing 108 is slidingly held against the backing housing 106 by means of a spring 110 retained on a high nut 112 by a snap ring 114 and a flat washer 116. The backing housing 106 and the sliding housing 108 are preferably made of a plastic material resistant to deterioration from winter road conditions.

Figure 9:
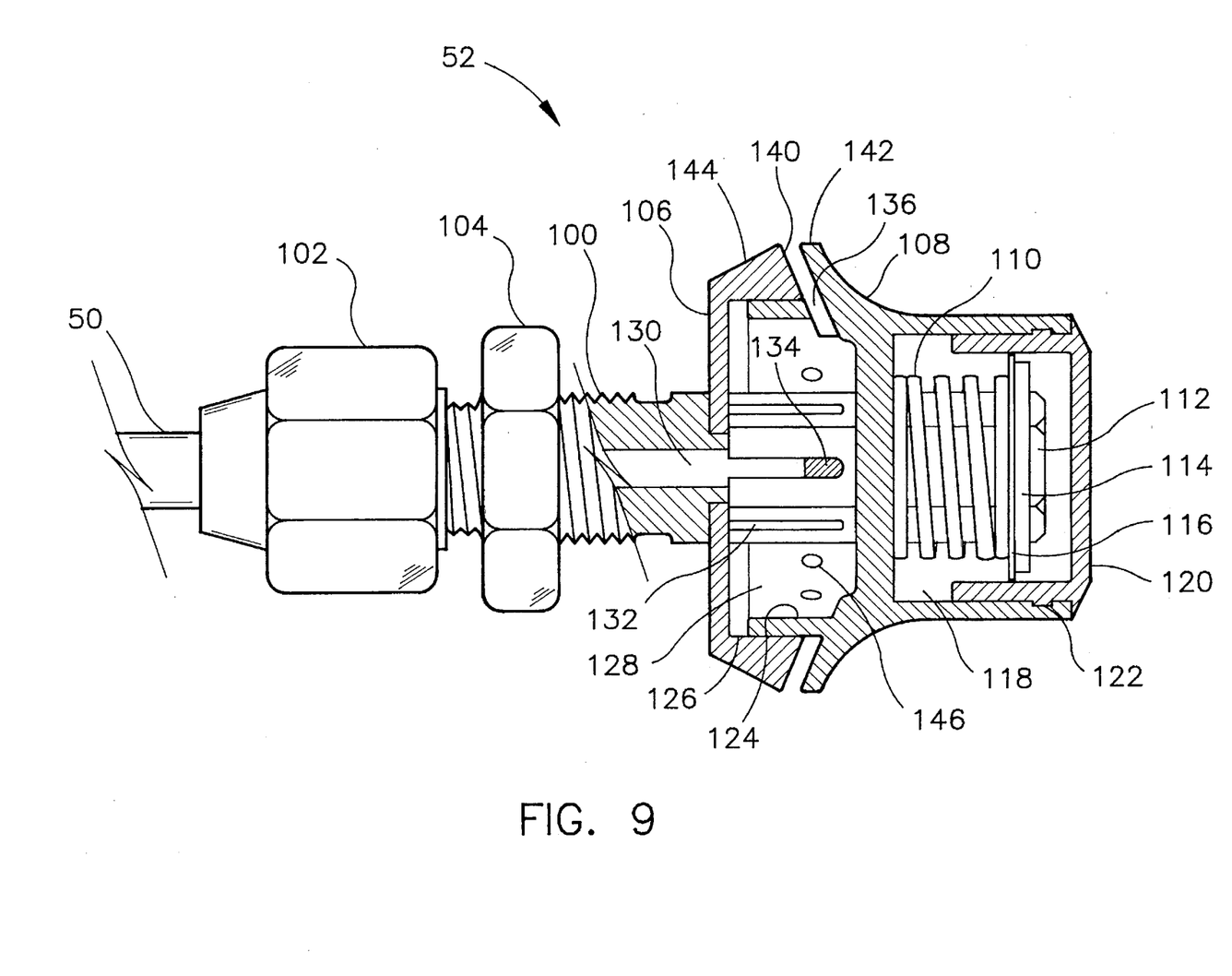
FIG. 9 is a cross-section of a popping nozzle.
Figures 10, 11, 12:
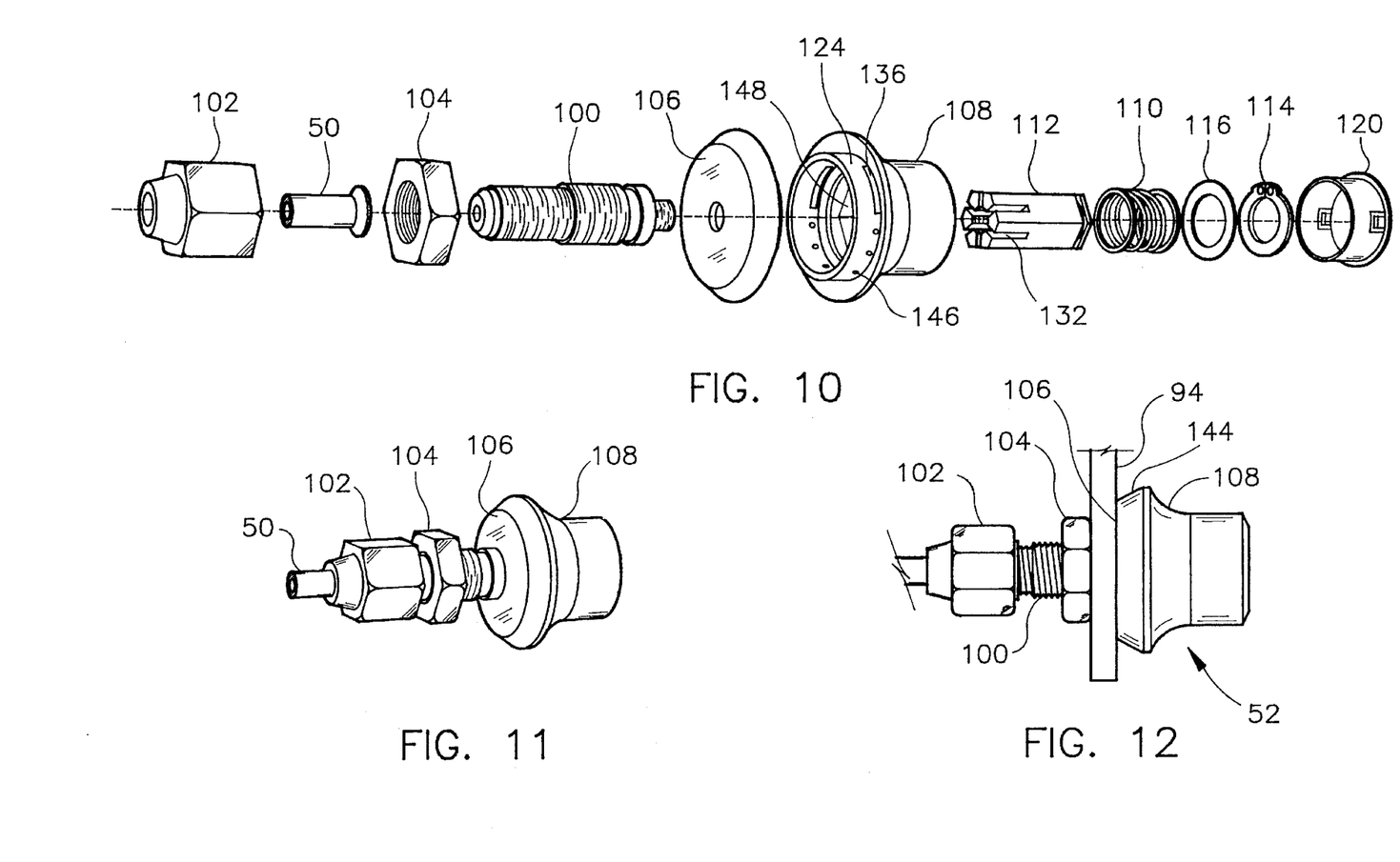
FIG. 10 is an exploded view of a popping nozzle.
FIG. 11 is a perspective view of a popping nozzle.
FIG. 12 is a side view of a popping nozzle mounted on a light fixture surface.

The spring assembly of the nozzle is enclosed in a cavity 118 of the sliding housing 108, and enclosed by a cover 120 which is made to snappily engage in an internal groove 122 in cavity 118. The cover 120 is also preferably made of a similar plastic material as the backing housing 106 and sliding housing 108.

The sliding housing 108 has a circular shoulder 124 which is dimensioned to slide fittingly inside a cylindrical portion 126 of backing housing 106. The circular shoulder 124 and the cylindrical portion 126 mate with one another to form an expandable piston chamber 128.

The air flow from tubing 50 is introduced into the piston chamber 128 through a passage 130 on the central axis of stem 100, and through slots 132 on the high nut 112. The slots 132 on the high nut 112 are longer than the engagement of the high nut 112 onto the stem 100, whereby the extremities of slots 132 provide openings 134 to let air enter the piston chamber 128.

The spring action on the sliding housing 108, and the axial displacement of sliding housing 108 on high nut 112 cause a sudden opening of the nozzle 52 only after a nominal pressure has built up inside the piston chamber 128. Thus the air flow from the nozzle 52 is a bursting flow, wherein the typical and ineffective initial seeping of conventional nozzle from restriction in the tubing system upon opening the solenoid valve is eliminated. Hence the entire volume of air taken from the air brake reservoir 32 is advantageously used to its full pressure and velocity potential.

The circular shoulder 124 of sliding housing 108 has circumferential slots 136 at one or two locations around the perimeter thereof, depending upon whether the nozzle is designed for installation on a double light fixture or on a single light fixture. The length of each slot 136 covers approximately an arc of between 30° to 90°, and preferably between 40° and 60°. Thereupon, the dotted lines 138 on FIGS. 6, 7 and 8 represent an air flow pattern with an arc length for slot 136 of between 40° and 60°.

When the blast wiper nozzles of the present invention are installed on a transport trailer having light lenses of 4" in diameter, the backing housing 106 has a preferred overall diameter of about 1½" and a preferred thickness of about ¼". The nozzle is preferably installed at a location which is about 4" to 5" from the centre of a light. When the nozzle is installed on a double light fixture, the preferred location is also at 4" to 5" from each light of the fixture.

Concurrently with the above dimensions, the backing housing 106 has a front frustum 140 having a conical surface following an angle of between 15° and 25°, and preferably an angle of about 20° from a plane perpendicular to the longitudinal axis of the nozzle. Similarly, the sliding housing 108 has a flared circular edge 142 which matches the shape of the front frustum 140, such that a stream of air expelled from within the piston cavity 128 through slot 136 is directed toward the surface to be cleaned, and deflected thereon in a tangential direction, under the layer of snow to be removed.

The backing housing 106 has further a rear frustum 144 having a maximum diameter near the front frustum 140. The purpose of this rear frustum 144 is to prevent the accumulation of melting or falling snow near the intersection of the flared edge 142 and front frustum 140, and to prevent thereby the obstruction by freezing of the nozzle 52.

Likewise, the circular shoulder 124 has a series of apertures 146 equally spaced in a same circumferential alignment than slot 136. Thus at every operation of the nozzle 52, a small amount of air is expelled through these apertures 146 to clean dust and snow from between the flared edge 142 and the front frustum 140, and hence to maintain the telescoping portion of the nozzle 52 free from freezing or obstructing substances.

Referring now specifically to FIGS. 10 and 12, the sliding housing 108 has a hexagonal opening 148 along its axis of displacement such that it slides fittingly over the high nut 112, while retaining its radial orientation relative to the high nut 112. To further retain the orientation of the sliding housing 108 relative to the light lenses to be cleaned, the nozzle 52 is mounted through a hole in mounting plate 94, and retained in place with the slots 136 oriented toward the light lenses, by tightening mounting nut 104 until mounting plate 94 is pressed tightly against backing housing 106.

While the preferred embodiment of the invention has been described as a retrofit kit with preset timers and popping type, self cleaning nozzles, other method of marketing the blast wiping system, and other type of nozzles and control devices are possible without altering the structure of the invention.

Therefore, the preferred embodiment of the invention as described herein is not limited thereto, and it will be apparent to those skilled in the art that numerous modifications form part of the present invention insofar as they do not depart from the spirit, nature and scope of the described and claimed invention.

I claim:

1. A blast wiper for cleaning snow from a light of a vehicle having a compressed air system, said blast wiper comprising essentially, automatic control means for regulating a flow of air from said compressed air system into intermittent gushes of air, said automatic control means comprising a first timer for regulating a span between said gushes of air, and a second timer for regulating a duration of each of said gushes of air, supply tubing means for connecting said automatic control means to said compressed air system, nozzle means for directing said intermittent gushes of air toward a surface of said light, and delivery tubing means for connecting said automatic control means to said nozzle means, whereby said intermittent gushes of air maintain said light of said vehicle visible when said vehicle is driving in snowy condition, and said automatic control means prevents a continuous outflow of air from said compressed air system.

2. A blast wiper as claimed in claim 1 wherein, said first timer is preset to a fixed value of between 5 to 10 minutes, and wherein said second timer is preset to a fixed value of between 1 to 3 seconds.

3. A blast wiper as claimed in claim 1 wherein, said automatic control means further comprises a solenoid operated directional valve for controlling said flow of air to said nozzle means.

4. A blast wiper as claimed in claim 3 wherein said automatic control means also comprises a push button switch for momentarily energizing said solenoid operated directional valve for verifying an operation of said nozzle means.

5. A blast wiper as claimed in claim 1 wherein, said light is mounted vertically, and said nozzle means is placed near a lower quadrant of said surface of said light, said nozzle means being further oriented to deflect said gushes of air in a tangential upward direction relative to said surface of said light, whereby a layer of snow on said surface is compressed upwardly and lifted off from said surface in a patch-like formation.

6. A blast wiper as claimed in claim 5 wherein, said light is a double light fixture having two light lenses, and wherein said nozzle means is placed between and near a lower quadrant of each of said two light lenses, said nozzle means having at least two orifices for deflecting said intermittent gushes of air toward a surface of each of said two light lenses, and in a tangential upward direction relative to said surface of each of said two light lenses, whereby said gushes of air from said nozzle means clean both said two light lenses of said double light fixture.

7. A blast wiper as claimed in claim 5 wherein, said surface of said light is circular and has a diameter of about 4" and wherein, said nozzle means has a tubular shape and a diameter of about 1½", said nozzle means has a circumferential slot around said tubular shape, said nozzle means being mounted near said surface of said light such that a longitudinal axis of said nozzle means is spaced at about 4" to about 5" from a centre of said surface of said light, and in a perpendicular relation therewith.

8. A blast wiper as claimed in claim 7 wherein, a circumferential length of said circumferential slot is an arc of between about 40° to about 60°.

9. A blast wiper as claimed in claim 7 wherein, said nozzle means has a deflecting surface to direct said gushes of air at an angle of about 20° from a plane perpendicular to said longitudinal axis, whereby said gushes of air from said nozzle means are deflected on said surface of said light, and into said tangential upward direction relative to said surface of said light, and under said layer of snow.

10. A blast wiper as claimed in claim 1 wherein, said nozzle means has a spring actuated expandable piston chamber and orifices communicating with said piston chamber when said piston chamber is expanded, whereby each said gush of air exits said piston chamber through said orifices upon an expansion of said piston chamber from a build-up of pressure therein.

11. A blast wiper as claimed in claim 10 wherein, said piston chamber comprises a cylindrical housing and a telescoping portion sliding in said cylindrical housing, and wherein said orifices comprises slots for directing gushes of air out of said piston chamber, and a plurality of holes for letting small volume of air escape said piston chamber, for blowing away snow, water and dust from said telescoping portion of said piston chamber.

12. A blast wiper as claimed in claim 1 wherein, said supply tubing means comprises a protection valve for preventing an outflow of air from said compressed air system, when a pressure inside said compressed air system is below a pressure setting of said protection valve.

13. A blast wiper as claimed in claim 12 wherein, said supply tubing means comprises also a manual shut-off valve for pneumatically isolating said supply tubing means from said compressed air system, during non-use period of said blast wiper.

14. A blast wiper as claimed in claim 1 wherein said automatic control means comprises an electrical control means energized from an electrical circuit of a park light of said vehicle, such that said automatic control means is operative only when said park light is turned on.

15. A blast wiper as claimed in claim 1 wherein said first timer is a flicker type electrical timer wherein a first output contact thereof is alternatively turned on and off when a first input signal is maintained on a first input coil thereof, and wherein said second timer is an off delay electrical timer wherein a second output contact is turned off after a preset time value, despite of a second input signal maintained on a second input coil thereof, by said first output contact, whereby each of said gushes of air is initiated by said first timer and interrupted by said second timer.

16. A retrofit kit for a blast wiping system for cleaning light lenses of a vehicle having a compressed air system, said retrofit kit comprising essentially, a protection valve means for connecting to said compressed air system for preventing an outflow of air from said compressed air system when a pressure in said compressed air system is below a pressure setting of said protection valve, an automatic control means for regulating a flow of air from said compressed air system into intermittent gushes of air, a single supply line tubing means connecting said protection valve means to said automatic control means, nozzle means for directing said intermittent gushes of air toward a surface of said light lenses, and delivery tubing means for connecting said automatic control means to said nozzle means.

17. A retrofit kit as claimed in claim 16 wherein said vehicle is a transport trailer.

18. A retrofit kit as claimed in claim 17 which further comprises, a double rear light fixture for a transport trailer having said nozzle means incorporated in a front surface thereof for optionally replacing said light lenses originally installed on said transport trailer.

19. A retrofit kit as claimed in claim 16 wherein said automatic control means is contained inside a moisture resistant control box, wherein electric components of said automatic control means are pre-wired, and wherein pneumatic components of said automatic control means are pre-tubed.

20. A retrofit kit as claimed in claim 16 wherein said automatic control means further comprises a first timer for regulating a span between gushes of air, and a second timer for regulating the duration of each said gush of air.

21. A retrofit kit as claimed in claim 16 wherein said nozzle means is made of a plastic material capable of resisting deterioration from winter road conditions.

22. A retrofit kit as claimed in claim 16 wherein said nozzle means comprises mounting means for positioning said nozzle means in a position below said light lenses, and in an orientation such that said gushes of air from said nozzle means are directed tangentially and upwardly relative to said surface of said light lenses.

* * * * *